(12) United States Patent
Hinchliff et al.

(10) Patent No.: US 7,675,609 B2
(45) Date of Patent: *Mar. 9, 2010

(54) USER-WORN RANGEFINDER SYSTEM AND METHODS

(75) Inventors: Thomas Hinchliff, Sherwood, OR (US); Michael Pfau, Hillsboro, OR (US)

(73) Assignee: NeverGuess Rangefinders, Inc., Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/125,850

(22) Filed: May 22, 2008

(65) Prior Publication Data

US 2008/0231829 A1    Sep. 25, 2008

Related U.S. Application Data

(63) Continuation of application No. 11/282,207, filed on Nov. 18, 2005, now Pat. No. 7,394,528.

(60) Provisional application No. 60/665,222, filed on Mar. 25, 2005.

(51) Int. Cl.
*G01C 3/08* (2006.01)
(52) U.S. Cl. .................. 356/5.02; 356/4.01; 356/5.01
(58) Field of Classification Search ............... 356/4.01, 356/5.01, 5.02
See application file for complete search history.

(56) References Cited

U.S. PATENT DOCUMENTS

| 4,109,390 | A |  | 8/1978 | Smith et al. |
| 4,178,693 | A |  | 12/1979 | Smith |
| 4,580,349 | A |  | 4/1986 | Webb et al. |
| 4,785,541 | A |  | 11/1988 | Lowry |
| 4,995,166 | A |  | 2/1991 | Knemeyer |
| 6,023,322 | A |  | 2/2000 | Bamberger |
| 6,061,919 | A |  | 5/2000 | Reichert |
| 6,073,352 | A | * | 6/2000 | Zykan et al. ............... 33/265 |
| 6,079,111 | A |  | 6/2000 | Williams et al. |
| 6,615,531 | B1 |  | 9/2003 | Holmberg |
| 6,651,355 | B2 |  | 11/2003 | Byrd |
| 6,868,614 | B2 |  | 3/2005 | Floied et al. |
| 2003/0044180 | A1 |  | 3/2003 | Lindberg |
| 2004/0222301 | A1 | * | 11/2004 | Willins et al. .......... 235/472.01 |

OTHER PUBLICATIONS

McNeill, M. D. et al., "Design of a Time-of-Flight Range-Finder," *29th ASEE/IEEE Frontiers in Education Conference*, Session 13d6, pp. 17-22 (Nov. 10-13, 1999).

* cited by examiner

*Primary Examiner*—Thomas H Tarcza
*Assistant Examiner*—Timothy A Brainard
(74) *Attorney, Agent, or Firm*—Klarquist Sparkman, LLP

(57) ABSTRACT

Embodiments of an arm-worn rangefinder device includes a rangefinder body and a switch. The rangefinder body is shaped for coupling to a user's arm and has an electronic rangefinder circuit operable to emit an energy beam directed at a selected target, to receive a reflected beam from the target, and to calculate the target's approximate range based on properties of the reflected beam and indicate the calculated approximate range to the user. The switch is coupled to the rangefinder body, and the user can use the switch to selectively actuate the rangefinder circuit.

3 Claims, 18 Drawing Sheets

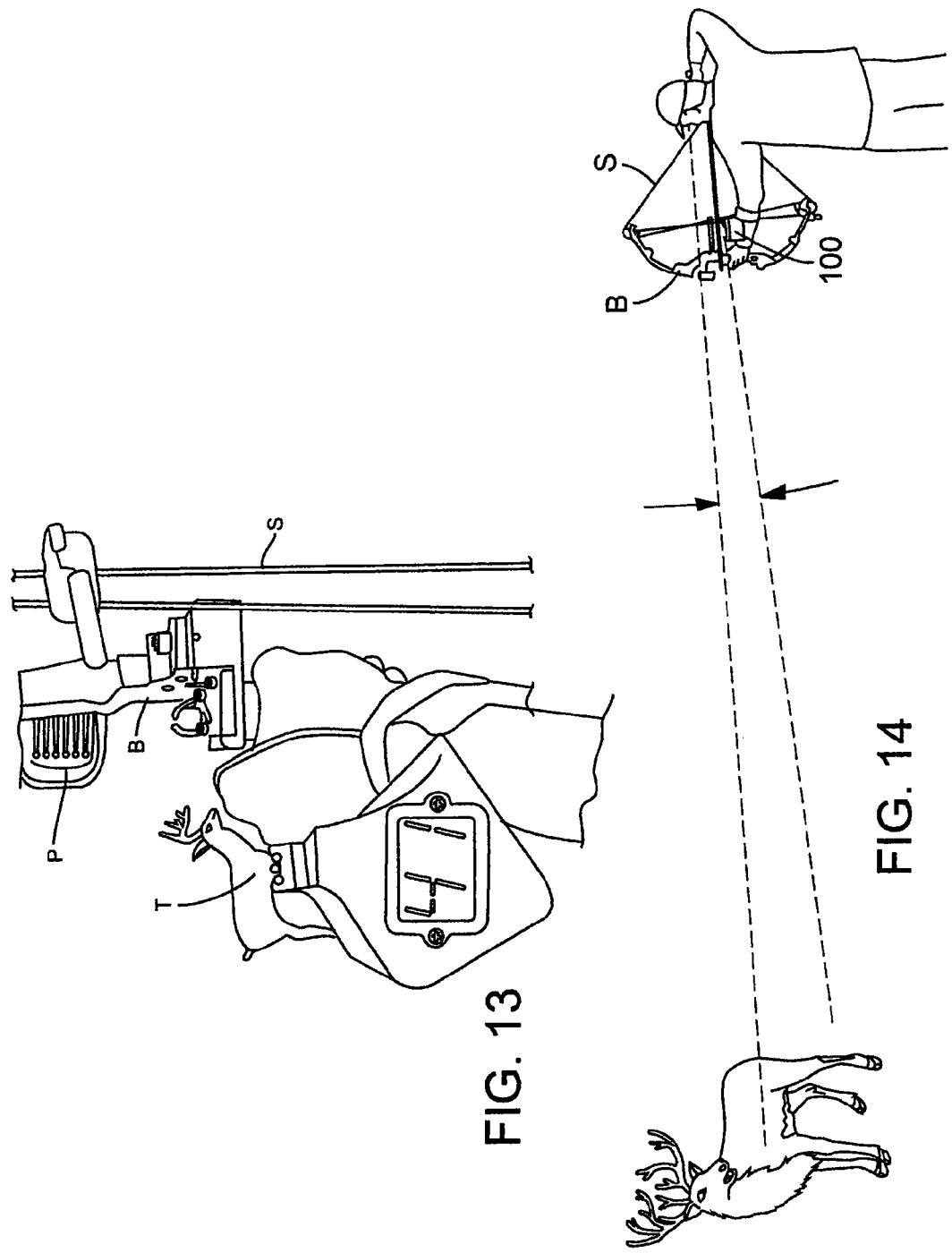

USER-WORN RANGEFINDER SYSTEM AND METHODS

RELATED APPLICATION

This application is a continuation of U.S. patent application Ser. No. 11/282,207, filed Nov. 18, 2005, now U.S. Pat. No. 7,394,528 which claims the benefit of U.S. Provisional Patent Application No. 60/665,222, filed Mar. 25, 2005. Both applications are incorporated herein by reference.

BACKGROUND

This application relates to electronic rangefinders, and in particular to a user-worn rangefinder.

Electronic rangefinders are used to calculate a distance between a reference location (usually the user's location) and a target. Conventional electronic rangefinders are typically portable electronic devices and generally resemble a pair of binoculars, a monocular or a camera that is held in the hands of the user.

Hunters and outdoor sports aficionados use range finders for different purposes. Hunters use range finders to determine the distance to their quarry so that they can adjust their aim for the calculated distance. Some golfers use rangefinders to determine the distance to the desired location where they would like to have their shots land.

Bow hunters and archers also use range finders. Because an arrow travels at a fairly slow speed and thus drops quickly, knowing the distance to the target greatly improves the bow hunter's chances of selecting the correct point of aim before releasing the arrow. Accurate shots are important to hunting success and clean kills. Bow hunters are typically in fairly close range to their targets before they take a shot, and thus their movements can easily reveal their location and spook the game. If the first arrow misses the target, there is rarely an opportunity to shoot a second arrow.

The ability to judge range accurately is difficult, so many bow hunters make use of range finders. Conventional laser range finders project a laser beam toward the topic and calculate its distance from the user based on the time it takes for a portion of the laser light reflected from the target to be sensed by a reflection detector and circuit within the range finder.

Handling a conventional rangefinder that must be held in one hand or both hands to be aimed at the target while bow hunting is difficult. Besides the difficulty in handling a rangefinder while still keeping the bow close at hand, use of a conventional rangefinder also takes additional time.

SUMMARY

Described herein are embodiments of a user-worn rangefinder system and methods that address some of the problems associated with current rangefinder devices. In particular implementations, the rangefinder system is worn on the user's forearm and allows the user to detect his range from a selected target while he maintains his bow in a drawn position. In particular implementations, the rangefinder system is separate from and has no connection to the bow itself.

According to one implementation, an arm-worn rangefinder device includes a rangefinder body and a switch coupled to the rangefinder body. The rangefinder body is shaped for coupling to a user's arm and has an electronic rangefinder circuit operable to emit an energy beam directed at a selected target, to receive a reflected beam from the target, and to calculate the target's approximate range based on properties of the reflected beam and indicate the calculated approximate range to the user. The switch is operable by the user to selectively actuate the rangefinder circuit.

The rangefinder body can have an outer surface in which a recess is defined, the recess being sized to fit over the user's forearm. The rangefinder device can be shaped for coupling to the user's arm in an area defined between about an elbow and about a wrist of the user's arm. The rangefinder body can include at least one flexible member sized to be adjustably tightened around the user's arm to couple the rangefinder body to the user's arm. The flexible member can be a first member, and there can be a second member, and the first and second members can be adjustable length straps capable of being tightened around the user's arm.

The switch can comprise a switch connected by a wire to the circuit within the rangefinder body. The switch can be configured for operation by a hand of the user's arm to which the rangefinder body is coupled. The switch can comprise a pressure switch having a mount capable of coupling the switch to one of the user's fingers.

The rangefinder body can comprise at least one sight positioned to allow the user to aim the rangefinder device at the target. The at least one sight can comprise a rear sight and a front sight. The rear sight and the front sight can comprise open, fiber optic-type sights.

The rangefinder body can comprise a mounting portion that is coupleable to the user's arm and a housing portion that is moveably coupled to the mounting portion to allow the user to position the housing portion for operation relative to the mounting portion when the rangefinder device is coupled the user's arm. An arm shield portion can extend from the rangefinder body and be positionable to protect an inner surface of the user's arm from inadvertent contact with a bow string released from a drawn position.

The rangefinder can comprise a display operable to provide the user with a visual indication of the calculated approximate range to the target. The rangefinder device can comprise a battery housed in the rangefinder body and connected to power the rangefinder circuit. The rangefinder body can comprise at least one removable access plate that is removable to allow access to an interior of the rangefinder body. Optionally, the rangefinder device can include a laser sighting portion selectively actuatable to project a laser beam in a direction toward a selected target to assist the user in aiming the rangefinder device at the target.

According to one implementation, a method of sighting a bow at a selected target based on a calculated range comprises holding the bow in a first hand and drawing a bow string of the bow to a drawn position with an opposite second hand, gazing generally along an outstretched first arm of the first hand holding the bow and through an electronic rangefinder device mounted to the first arm and extending generally in the direction of a selected target, actuating the rangefinder device to determine the calculated range to the selected target and selecting a sighting reference based on the calculated range, moving the bow as necessary while the bow remains drawn to align the selected sighting reference with the selected target.

Actuating the rangefinder can comprise actuating a switch connected with the rangefinder device with the first hand.

According to another implementation, a rangefinder device for use in archery and bow hunting comprises an electronic rangefinder device capable of calculating an approximate range between a user of the device and a selected target and displaying the calculated range to the user, the rangefinder device being operable by the user while the user is holding the bow in one hand and holding the bow string drawn in the other, wherein the device is supported by the user and is not attached to the bow.

The user-worn rangefinder device can be used about as quickly and with about the same limited body movement as a bow-mounted rangefinder, but it is separated from the bow itself. Thus, the rangefinder device does not affect the size and weight of the bow or affect the bow's sight picture. Also, because the rangefinder device is not connected to the bow, it is not subject to the same legal restrictions of bow-mounted electronic devices. Since the user-worn rangefinder is operable while the user's arm is in an outstretched or extended position, i.e., holding an object such as a bow or a hand gun or long arm, the rangefinder device can be used in other settings where hands-free rangefinding is desired. Such application would include, but are not limited to, tactical riot control situations where firearms must be maintained in raised positions and/or other sports-related activities.

The foregoing and other features and advantages will become more apparent from the following detailed descriptions which proceeds with reference to the accompanying figures.

BRIEF DESCRIPTION OF DRAWINGS

FIG. 13 is a view of the rangefinder system in use as seen by a user holding a bow and showing the display, the rangefinder sights aligned on the target and the close proximity of the bow's sight to the rangefinder.

FIG. 14 is a side elevation view showing a user sighting through a sight on a bow at a target and showing the close proximity of the sighting axis for the rangefinder system mounted on his forearm.

DETAILED DESCRIPTION

Figure 1:
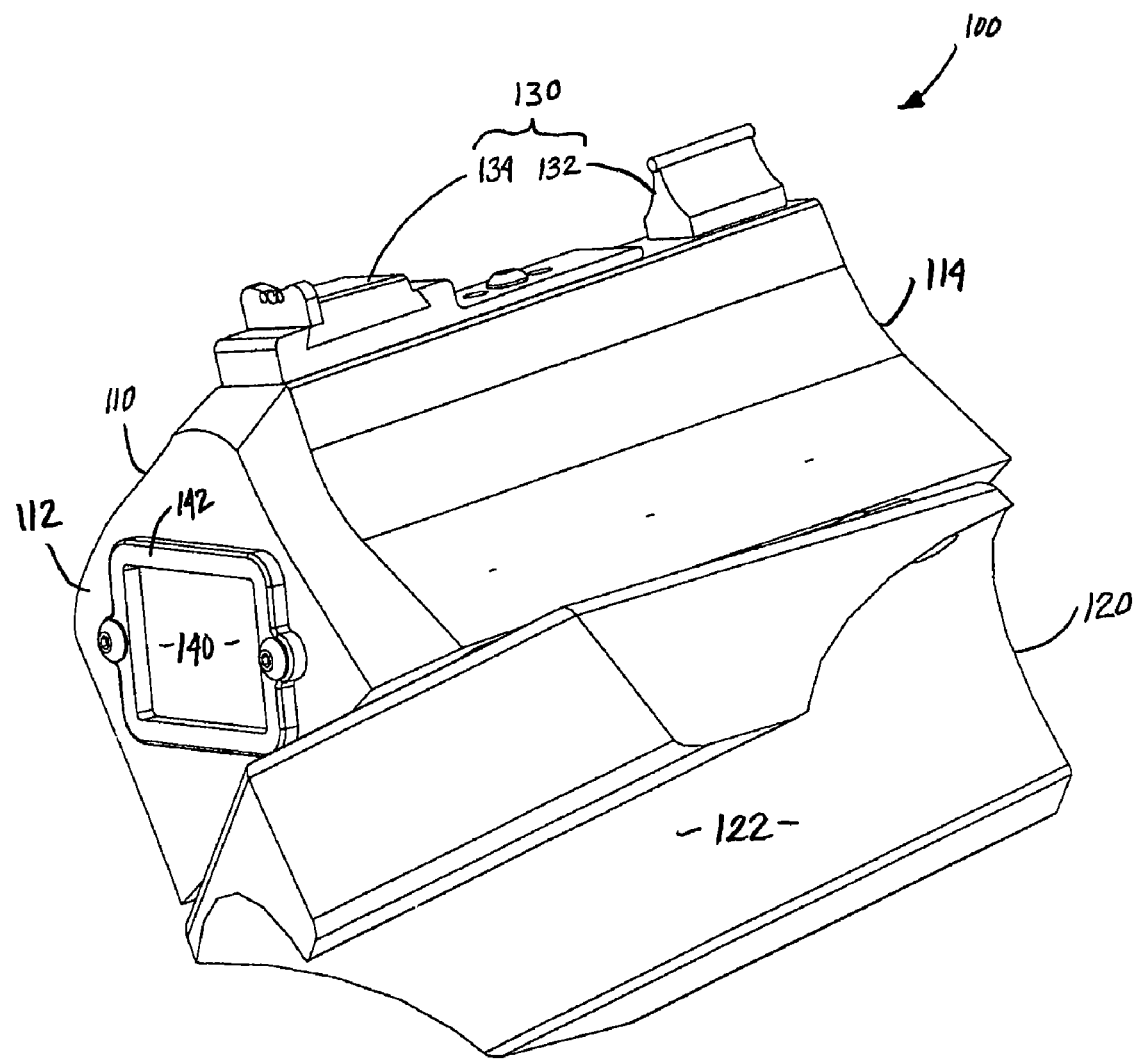
FIG. 1 is a perspective view of the rangefinder system showing the housing, the display positioned at the rear end of the system and the attached mounting portion.
Figure 2:
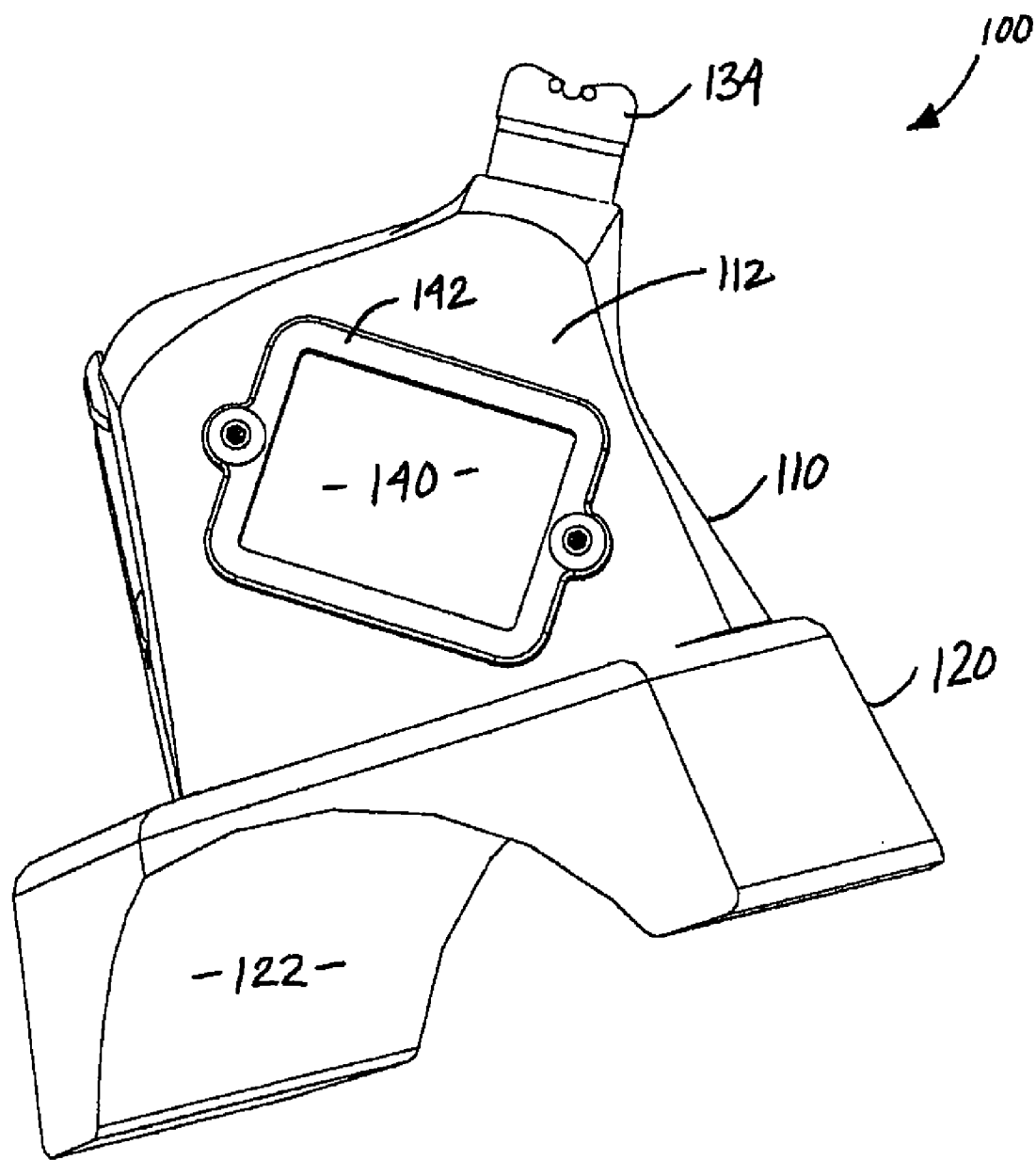
FIG. 2 is a rear end view of the rangefinder system of FIG. 1.

Currently, there are three types of conventional rangefinders available for bow hunters to use:

(1) Binocular or Monocular Style Laser Rangefinders: These units operate similar to a conventional pair of binoculars or telescope. The hunter looks though a viewer, positions crosshairs (or other indicia) on the target, and actuates the rangefinder circuit (i.e., pushes a button on the unit). The range is displayed over the crosshairs. The hunter must then free his hands of the device, pick up his bow, nock an arrow, aim and shoot. This process requires additional body motion and consumes additional time.

(2) Bow Mounted Laser Rangefinder: Bushnell currently sells the Yardage Pro® Bow rangefinder device. It mounts directly to the hunter's bow, allowing him to acquire the range and take a shot. Although this device may address some of the shortcomings of the binocular/monocular rangefinders, it is bulky and adds weight and size to the bow. Also, it is currently illegal in 14 of 50 states (accounting for about 12% of the bow hunter population) to have any electronic device attached to a bow while hunting. Further, the Pope and Young Club, a national organization that maintains big game bow hunting records for North America, will not recognize any record that occurred with an electronic device attached to a bow.

(4) Comparative/Visual/Pendulum Rangefinders: These rangefinders are not electronic devices. These rangefinders attach to the bow like a standard sight, and have reference bars that are the size of common objects (like a deer) at various ranges. When the hunter sees a deer, he determines which of the bars appears the same height as the deer, and thus deduces the range, usually in 10 yard increments. Such comparative rangefinders are not very accurate and are difficult to use.

One technology used by electronic rangefinders is LIDAR, which is an acronym for LIght Detection And Ranging. LIDAR, sometimes referred to as a "Time of Flight" method, shares some of the same principles as RADAR. With LIDAR, a unit transmits light out to a target. The transmitted light interacts with and is changed by the target. Some of this light is reflected or scattered back to the instrument where it is analyzed. The change in the properties of the reflected light enables some property of the target to be determined. The time for the light to travel out to the target and back to the LIDAR device is used to determine the range to the target.

One implementation of an arm-worn rangefinder system 100 is shown in FIGS. 1-8B. The rangefinder system has a housing 110 that is movably connected to a mounting portion 120. The mounting portion 120 is configured for mounting to a user's arm and has an inner shaped surface 122 shaped for this purpose. The shaped surface 122 can be fitted with cushioning material to provide for a comfortable fit.

At a rear end 112 of the housing 110, there is a display 140 that provides a visual interface between the user and the system 100. Sights 130, including a rear sight 134 and a front sight 132, are mounted to an upper surface of the housing 110.

Figure 3:
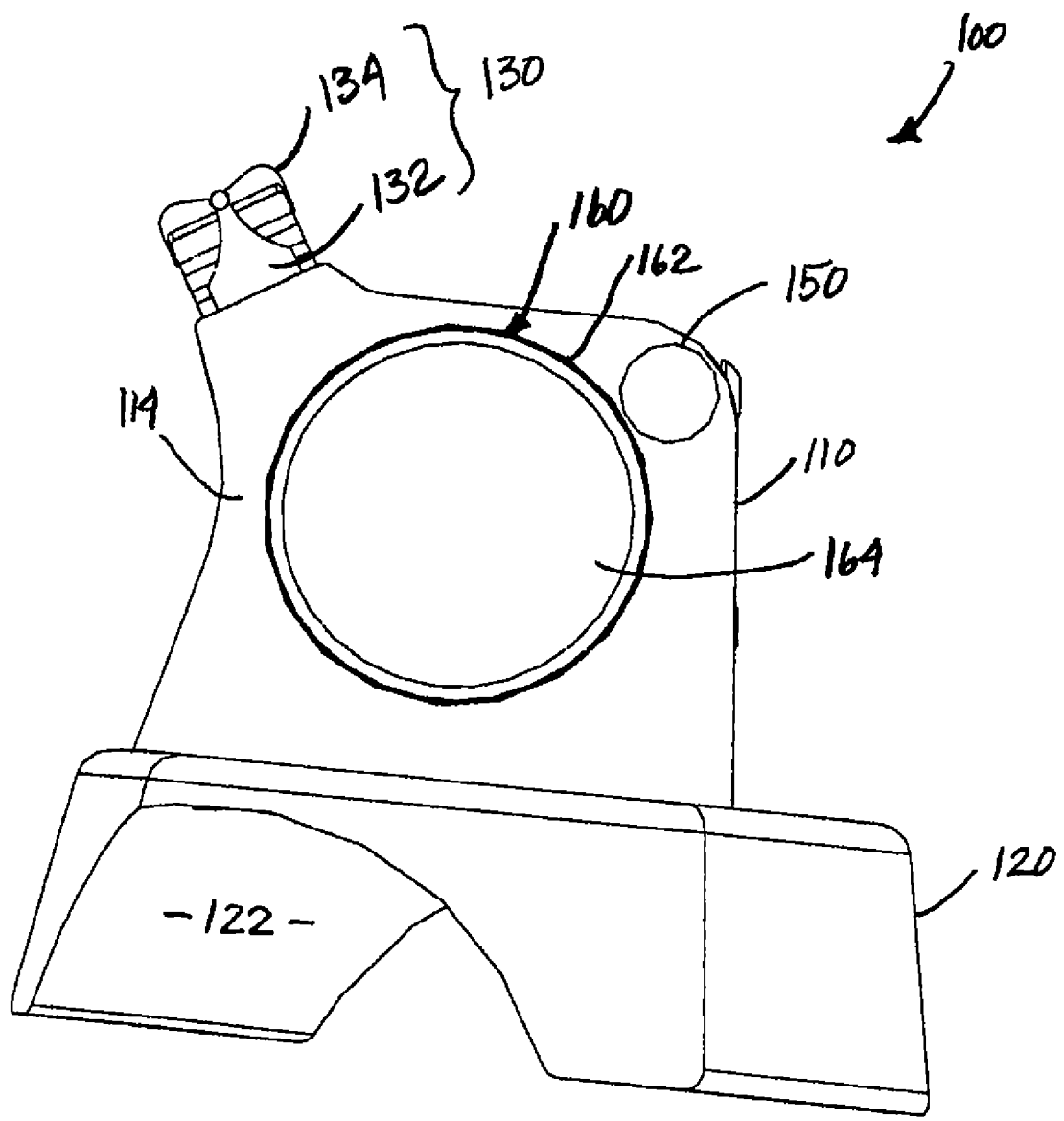
FIG. 3 is a forward end view of the rangefinder system of FIG. 1 showing the axially positioned reflection collector and the pulse generator, which is positioned off-axis.

Referring to FIG. 3, a pulse generator 150 and a reflection collector 160 are positioned at a forward end 114 of the housing. The pulse generator 150 generates pulses of light that travel to the target, and a portion of this light is reflected back toward and collected by the reflection collector 160. As is described more fully elsewhere, the distance between rangefinder system 100 (i.e., and the user wearing it) and the target is calculated based on the reflected light parameters and is displayed to the user on the display 140.

Figure 4:
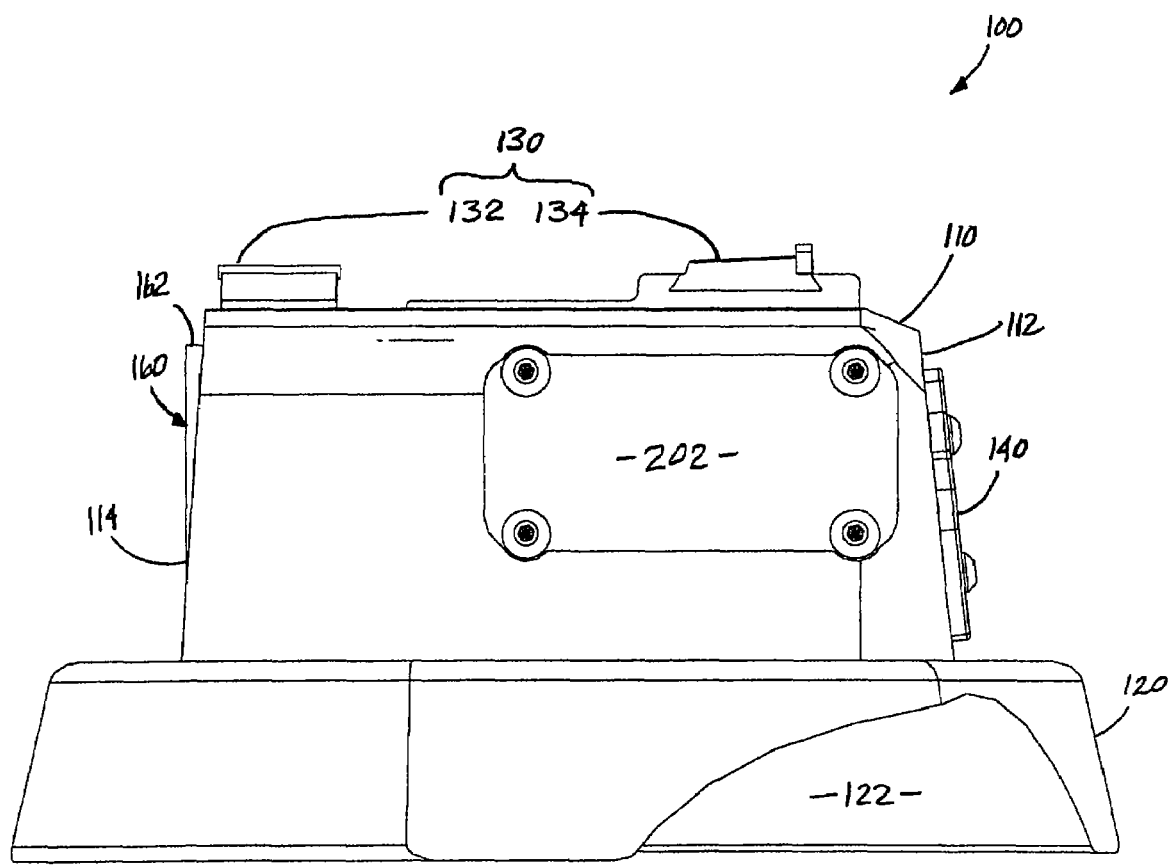
FIG. 4 is a left side view of the rangefinder system of FIG. 1.
Figure 5:
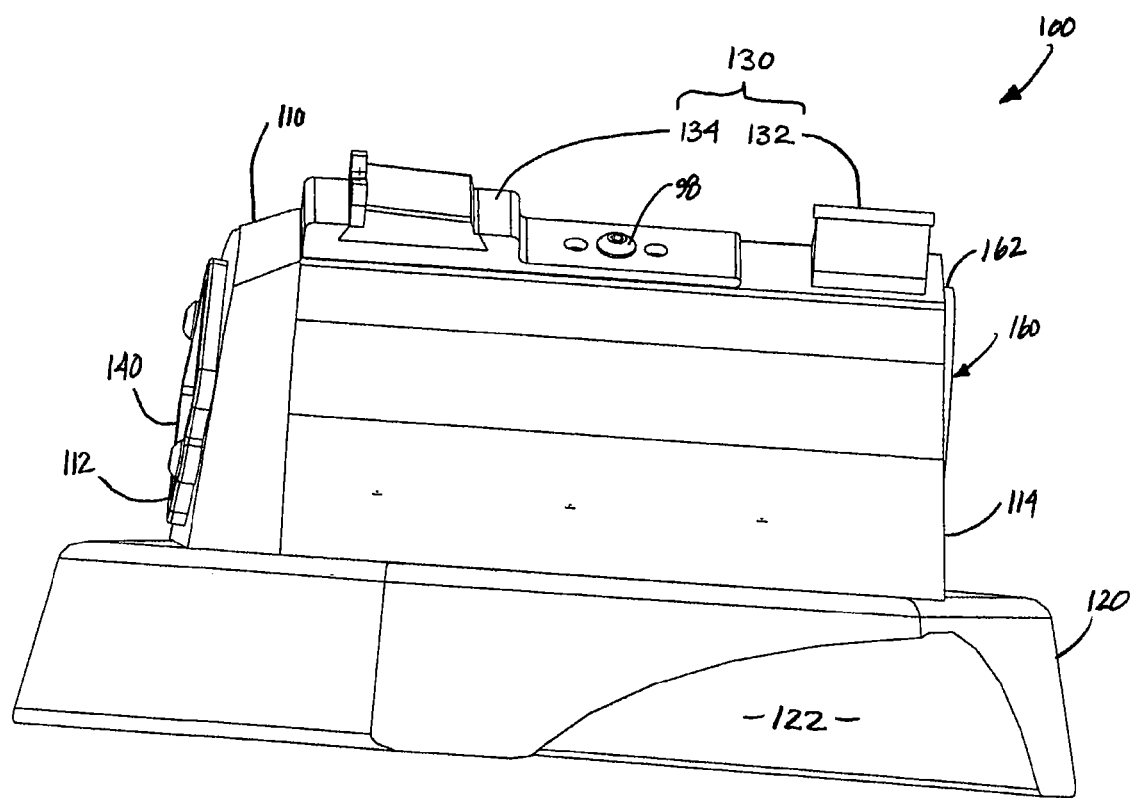
FIG. 5 is a right side view of the rangefinder system of FIG. 1.
Figure 8A:
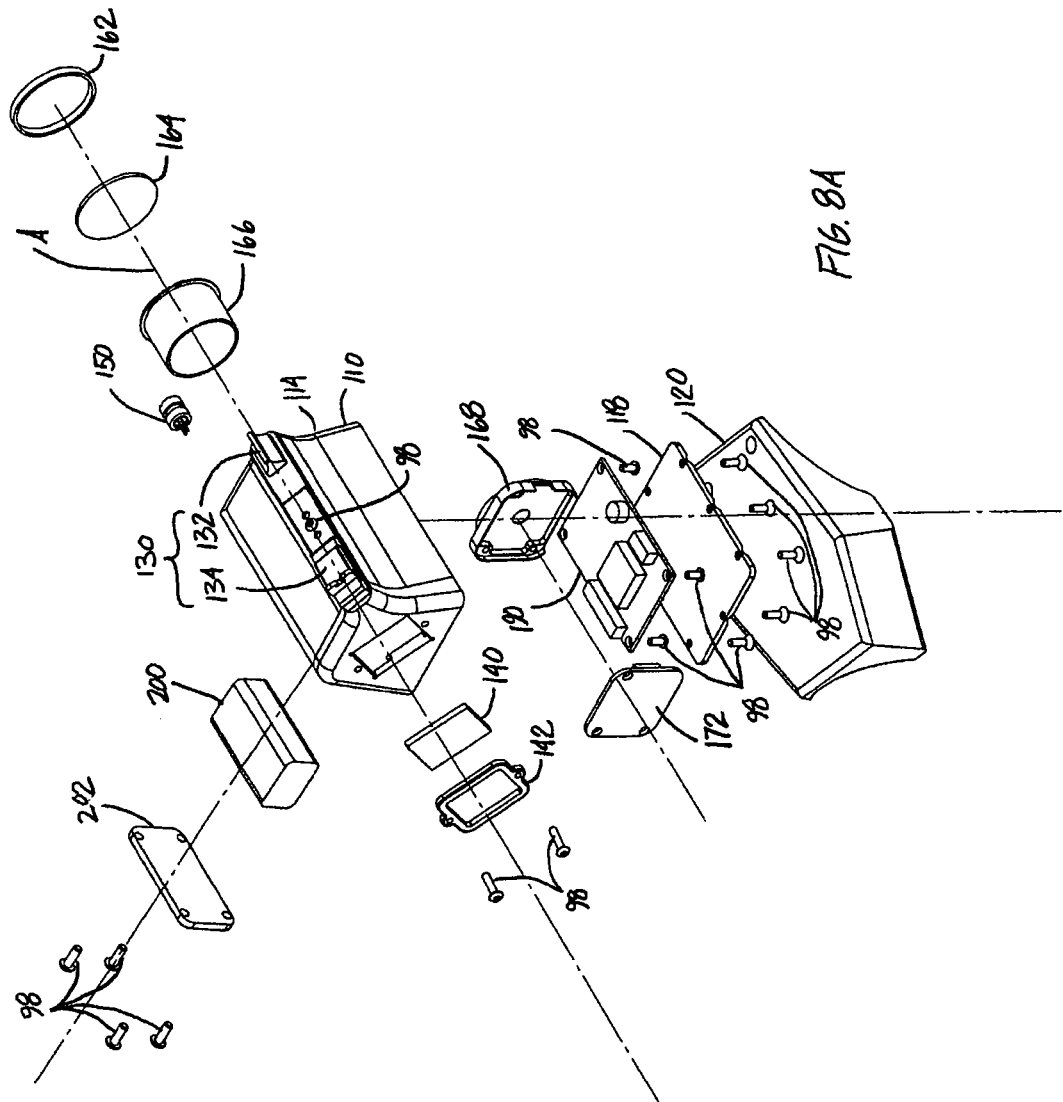
FIGS. 8A and 8B are exploded perspective views of the rangefinder system of FIG. 1.
Figure 8B:
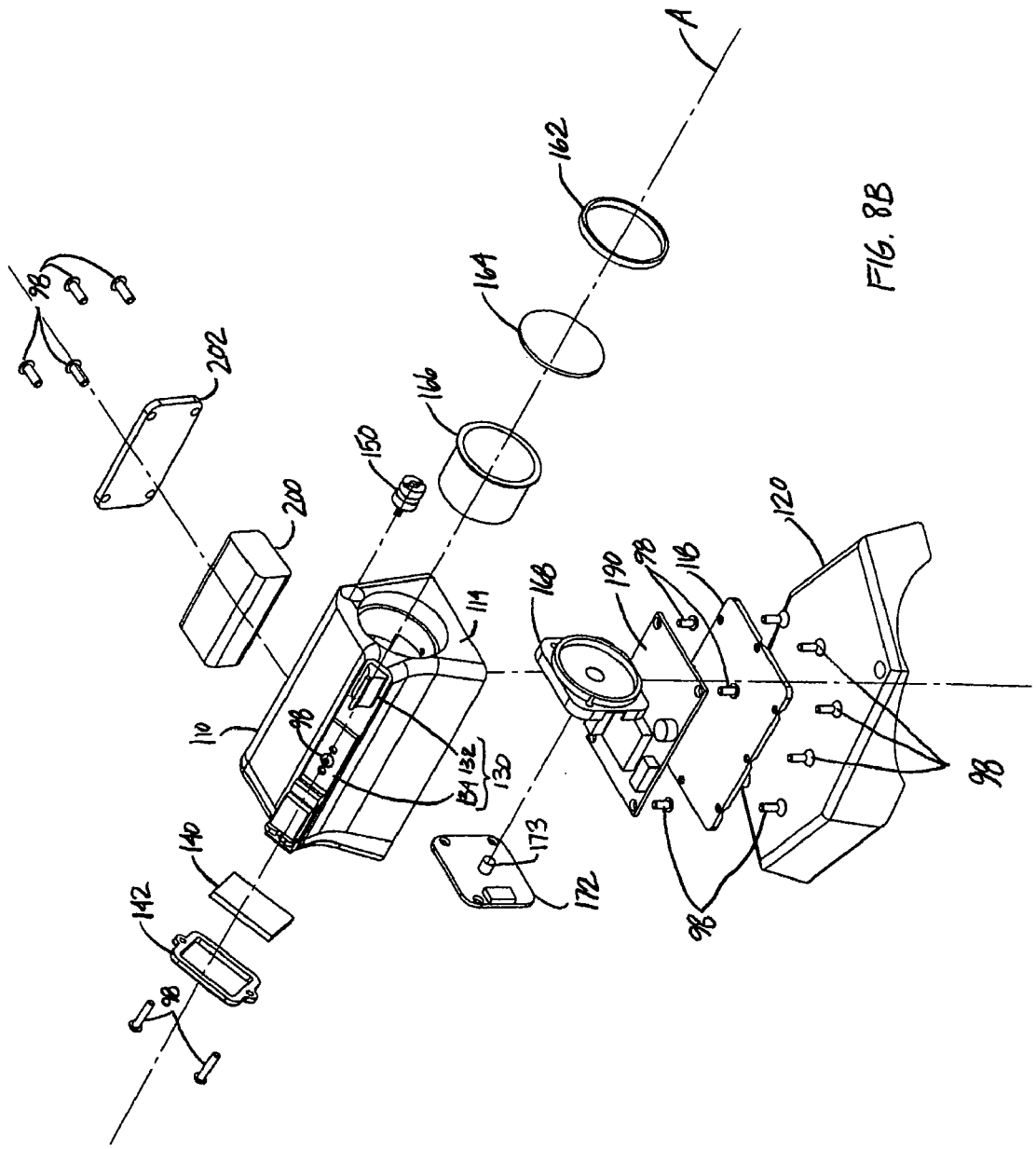

FIG. 4 is a side view of the system 100 showing a battery panel 202 which is removable to install or change a battery 200 (shown in FIGS. 8A and 8B).

Figure 6:
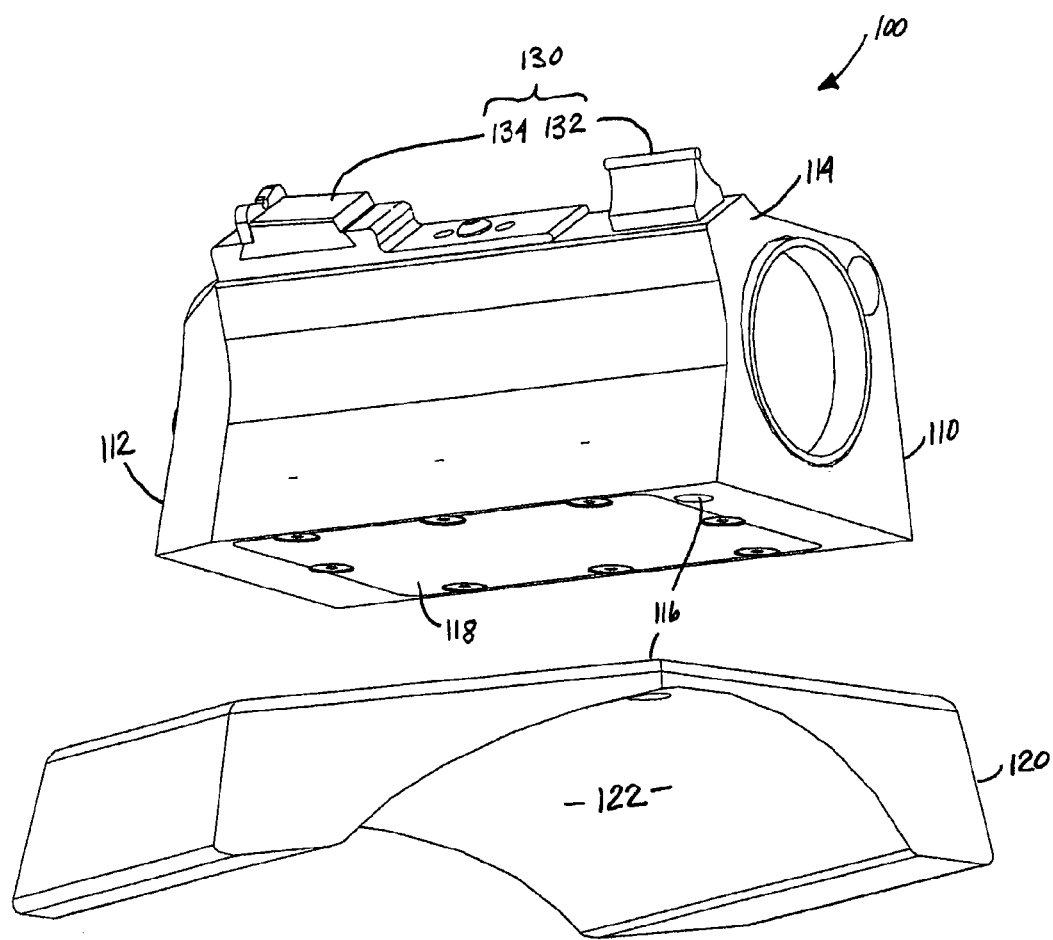
FIG. 6 is a perspective view of the rangefinder system of FIG. 1, except the movable housing is shown separated from the mounting portion to illustrate the pivotable connection between these components.
Figure 11:
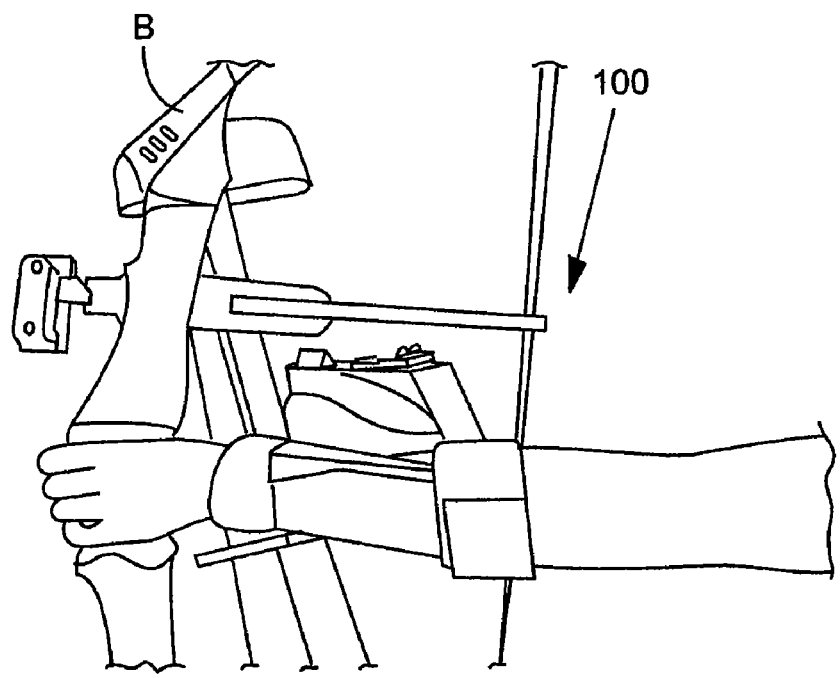
FIG. 11 is a side elevation view of a user holding a bow in his left hand with the rangefinder system mounted to his outstretched left forearm and ready for operation.
Figure 12:
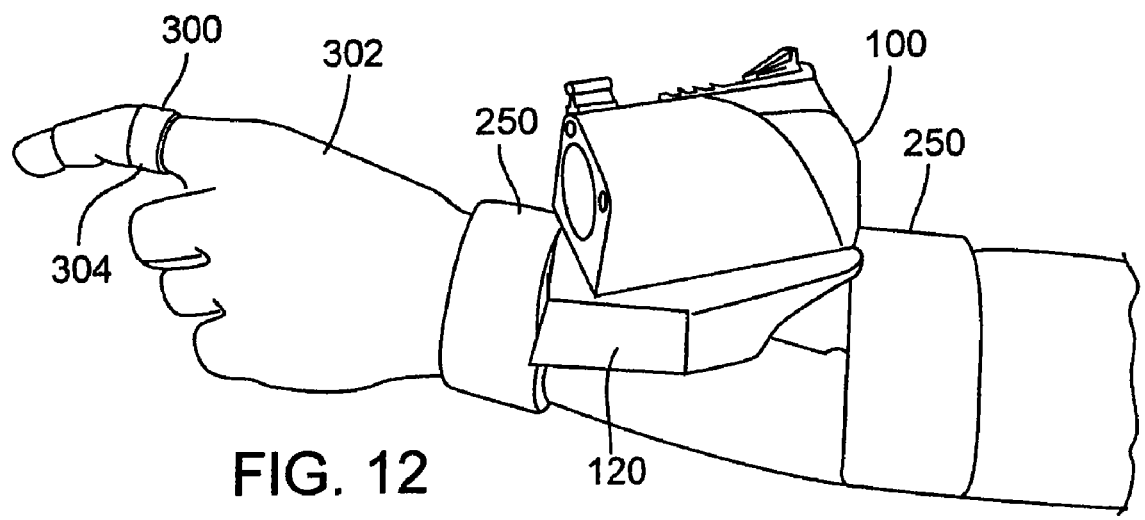
FIG. 12 is another side elevation view of a user with the rangefinder system mounted to his outstretched left forearm, also showing the switch for operating the system positioned for activation by the user's left hand.

As best shown in FIG. 6, the housing 110 can be movably connected to the mounting portion 120 (also called a "gimball block"), which usually remains stationary on the user's outstretched arm during use (see FIGS. 11 and 12). In particular, there can be a pivot connection 116 allowing the housing 110 to pivot relative to the mounting portion 120 such that the user can move the housing 110 to a convenient position for sighting targets and viewing the display 140. In other implementations, the housing 110 is configured to translate relative to the mounting portion 120, either instead of or in addition to the pivoting action. In other implementations, it is not be necessary to provide for a housing that is movable relative to the mounting portion.

Figure 7:
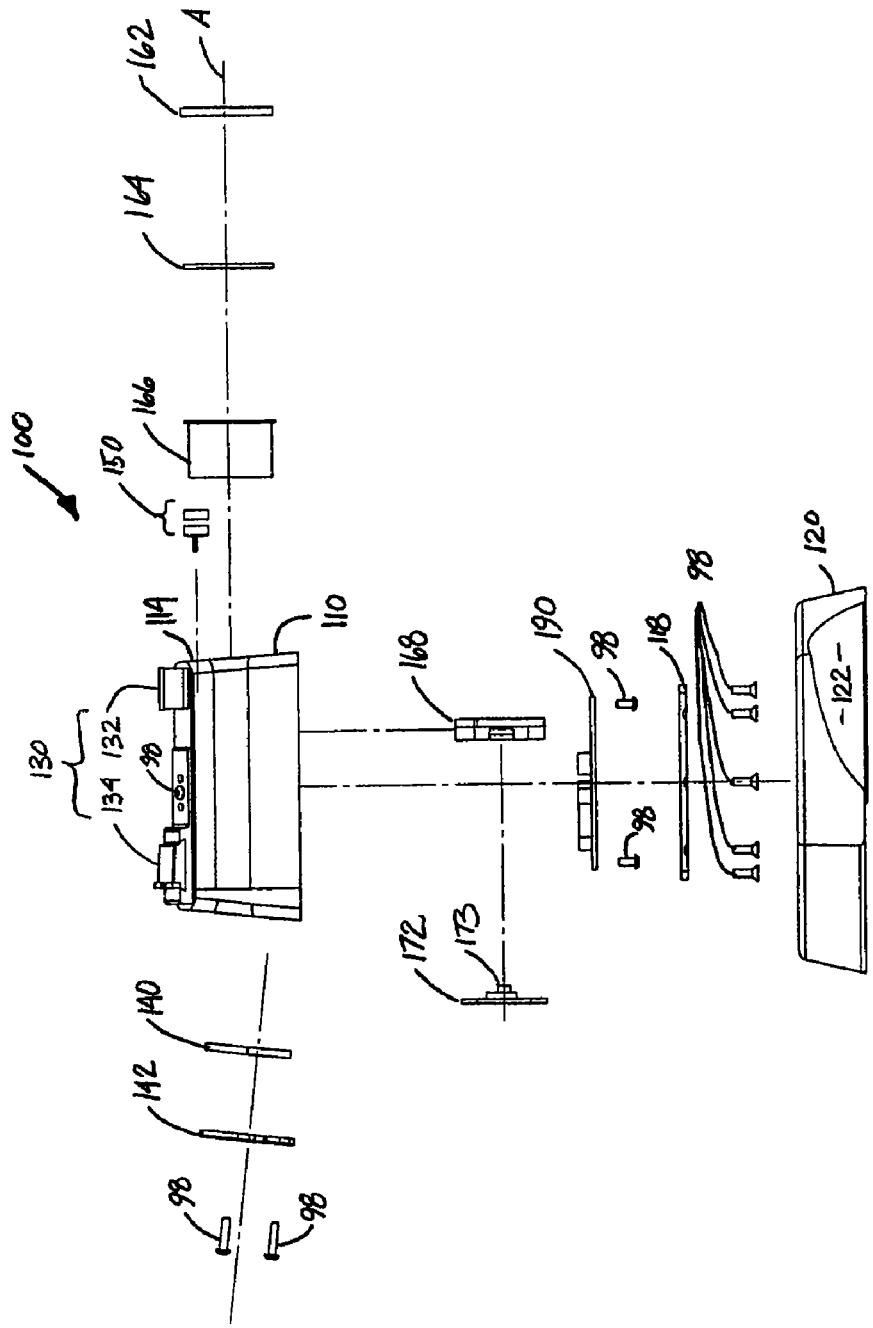
FIG. 7 is an exploded elevation view of the rangefinder system of FIG. 1 with some of the optical components arranged along an optical axis of the system.

FIG. 7 is an exploded elevation view, and FIGS. 8A and 8B are exploded perspective views, of one implementation showing major components of the rangefinder system 100. FIGS. 7, 8A and 8B show a bottom plate 118 disassembled from the housing 110 to allow access to the main circuit board 190 and other components.

Referring to the right side of FIG. 7, there is a threaded retaining ring 162 that serves to retain a lens 164 in place at a position adjacent the outer end 114 of the housing 110. An optical axis A is defined as passing through the center of the lens 164. From right to left in FIG. 7, a lens positioning sleeve 166 and a photodiode housing 168 serve to position a photodiode housing 172 with an axially positioned photodiode 173 at an appropriate focal length from the lens 164. The lens 164 and the photodiode 173 are the principal components of the reflection collector 160.

The pulse generator 150 has an infrared laser diode positioned with one end adjacent the forward end 114 of the housing 110. In the illustrated embodiment, the pulse generator 150 is spaced apart from the optical axis.

Figure 9:
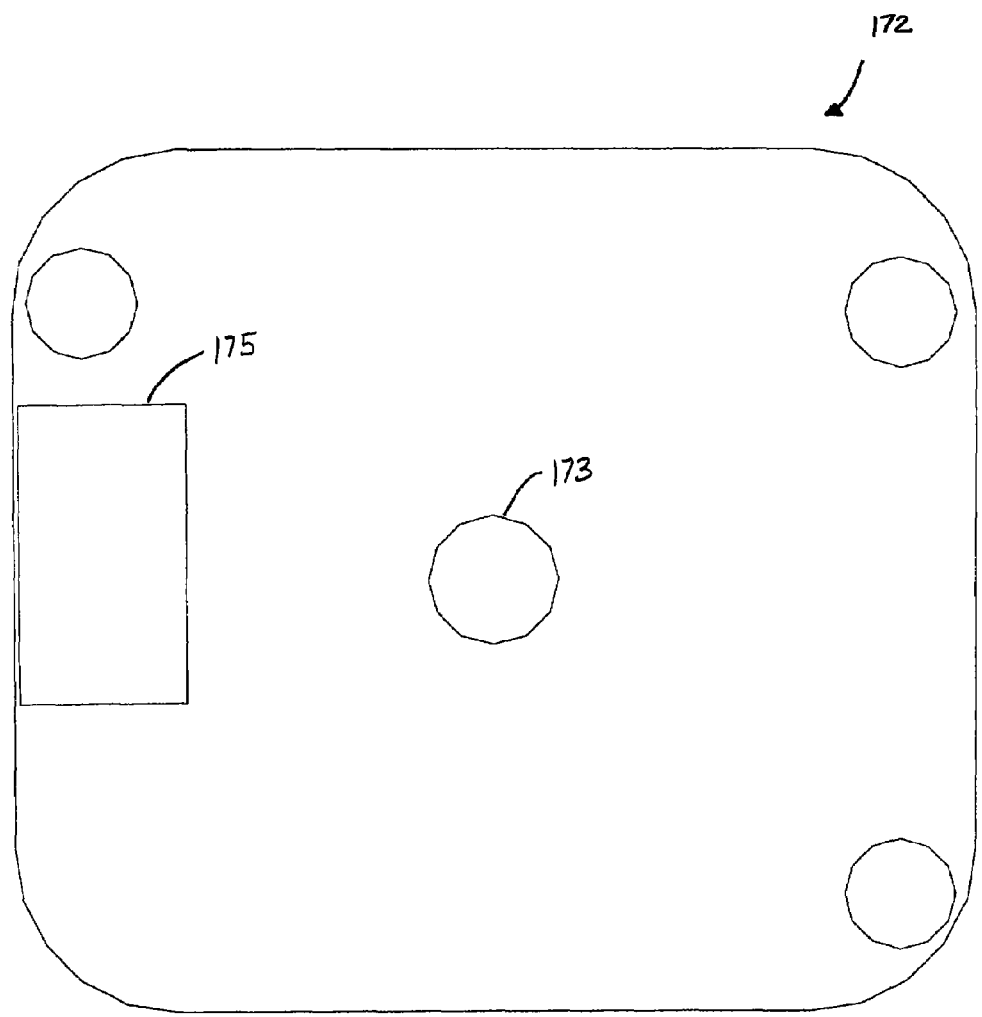
FIG. 9 is a plan view of the photodiode board showing the axially positioned photodiode and a photodiode circuit element.

Within the housing 110, there is a main circuit board 190 that is powered by the battery 200. In addition to the battery 200, the circuit board 190 includes connections to a photodiode circuit via a jumper ribbon 175 (see FIG. 9), the display 140 and a switch 300 (see FIG. 12) for activating the system.

The lens 164 is preferably a Fresnell lens, although other types of lenses could also be used. Fresnell lenses are useful where relatively short focal lengths are required. Suitable Fresnell lenses include Item No. 16.7100 (focal length 22 mm) and Item No. 16.7150 (focal length 32 mm) sold by Rolyn Optics Company of Covina, Calif. The lens 164 serves to focus the received signal that bounces back from the target and focus it on the photodiode 173.

The display 140 is preferably an LCD display, although other types of displays could also be used. One suitable display is a chip on glass type with a jumper ribbon conductor (not shown) connecting it to the main circuit board 190. As shown, there is a retaining frame 142 attached to the rear end 112 of the housing 110 that protects the display 140.

One suitable photodiode 173 is a PIN photodiode. The purpose of any photodetector is to convert electro-magnetic radiation into an electronic signal, ideally one that is proportional to incident light intensity. In other implementations, another type of photodetector other than a photodiode is used.

The sights 30 are used to aim the rangefinder system 100 accurately at a desired target. In the illustrated implementation, open sights are used because they are relatively lightweight, easy to use and rugged. Of course, it would be possible to use other types of sights. One type of open sights used for the rangefinder system 100 are sights with fiber optic light gathering elements that provide a distinct sight picture, such as the handgun or long gun sights sold by TRUGLO, Inc. of Richardson, Tex. In the illustrated implementations, the rear sight is attached to the housing with one or more fasteners 98, such as a cap screw (FIG. 5), and the front sight is attached with a dowel pin (not shown), although other approaches could also be used.

Figure 10:
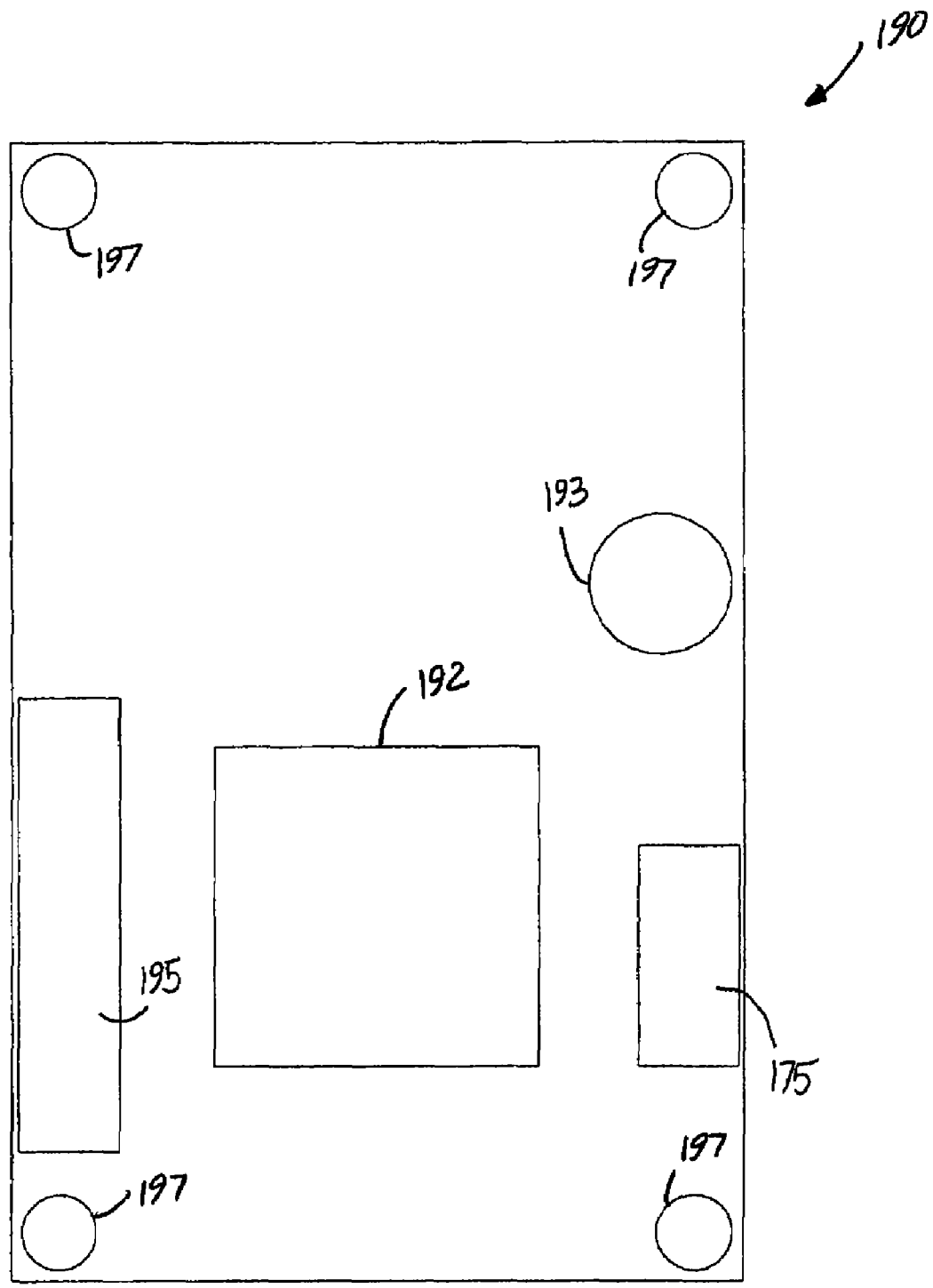
FIG. 10 is a plan view of the circuit board showing the placement of several major components schematically.

Possible locations of some of the circuit board 190 components are shown schematically in FIG. 10. As shown in FIG. 10, these components include a capacitor 193, the other end of the jumper connector 175 connected to the photodiode 173, and a second jumper connector 195 connected to the LCD 140. Also shown are mounting holes 197 located in the corners of the circuit board 190.

Referring to FIGS. 11 and 12, the system 100 can be held in place using one or more securing members, e.g., adjustable length straps configured to wrap around the user's forearm. In the illustrated implementation, two such spaced apart straps 250 are shown. It would also be possible to attach a sleeve or "gauntlet" to the mounting portion that the user would wear like a glove or cycling arm warmer, which would be secured with straps (see, e.g., FIG. 20) or with a lace-up arrangement. An additional securing member configured to be supported by the user's thumb, i.e., a thumb loop could also be provided.

Referring to FIG. 12, the switch 300 can be a wired switch as shown that is connected by a cable 302 to the main circuit board 190 within the housing 110. In other embodiments, it would be possible to configure the switch 300 as a wireless switch that controls the system 100 through wireless signals (including RF, Bluetooth and/or infrared, as examples). In the illustrated embodiment, the switch 300 is a finger-activated switch configured for actuation by the user's left index finger. As shown, the switch can be worn on a finger using a band 304 of flexible material. Other switching arrangements that allow easy activation of the system without requiring significant body movement are possible. For example, it would be possible to configure the rangefinder system to be automatically activated at predetermined time intervals for a desired period, such as every 5 seconds for 3 minutes. Alternatively, the rangefinder system can be configured with a function-oriented switch, such as, e.g., a mercury switch, that triggers operation of the rangefinding circuit when certain conditions are met, e.g., such as when the system is held still for at least several seconds.

Referring to FIGS. 11-14, the operation of the rangefinder system will be explained. In FIG. 11, the rangefinder system 100 has been attached to his left arm with the straps 250, and his left arm is outstretched and holding a bow B. FIG. 12 shows the attachment of the rangefinder system 100 to the user's arm and the hand-activated switch 300 for activating the system in more detail.

Figure 16:
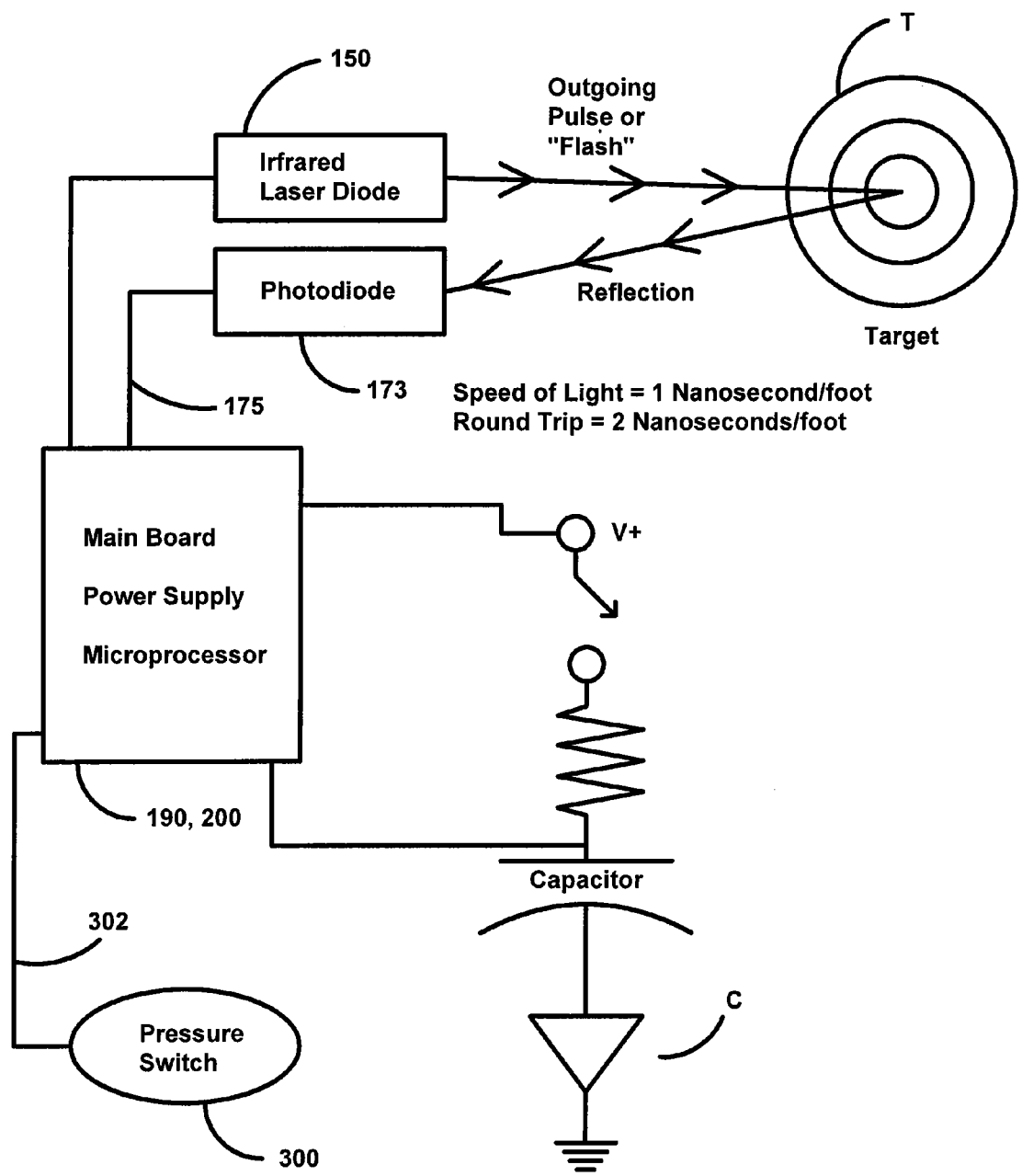
FIG. 16 is a block diagram showing components of the rangefinder system and their operational relationship during a rangefinding process.

FIGS. 13, 14 and 16 show the rangefinder system 100 in use by a user sighting at a target T. FIG. 13 shows a user's view along his outstretched left arm after he has aligned the sights 130 at the desired target T and actuated the switch 300. Actuation of the switch causes the pulse generator 150 to generate light pulses that travel from the system. 100 toward the target T. As shown in FIG. 16, at about the same time as the light pulses are generated, a capacitor C (such as the capacitor 193) in the circuit begins charging. The charge accumulated by such a capacitor follows a substantially linear relationship over time, and thus the charge can be correlated to time and distance.

A portion of the light directed at the target T is reflected back, focused by the lens 164 and caused to be collected by the reflection collector 160, and specifically the photodiode 173. This interrupts the charging in the capacitor C.

The portion of collected light as represented by the charge in the capacitor C is processed by the main circuit board 190/microprocessor 192 and a distance between the system 100 and the target T is calculated. The calculated distance is displayed on the display 140. Thus, in this example, the calculated range between the user and the target is about 41 yards, as is shown on the display 140 in FIG. 13. The distance can also be displayed in other units, such as feet or meters.

Various implementations of the rangefinding circuit can be used. One known rangefinding circuit implementation is described in "Design of a Time-of-Flight Range-Finder," by Mark D. McNeill, Lawrence Williams and HauMeng Chu, $29^{th}$ ASEE/IEEE Frontiers in Education Conference (1999), which is incorporated herein by reference. It is also possible to incorporate a memory element into the circuit.

Once the user has determined the range to the target T, he can shift the position of left arm very slightly to align his gaze relative to an appropriate one of the sight pins P (or other bow sight feature) projecting from the left side of the bow in FIG. 13 corresponding to the calculated range and toward the target T. FIG. 14 is a side elevation view showing the relatively small shift required between sighting along the axis for the rangefinder system 100 and sighting along the bowsight axis. Thus, the user makes very little movement, and possibly no movement, in the process of determining the range to the target and subsequently sighting on the target.

Figure 17:
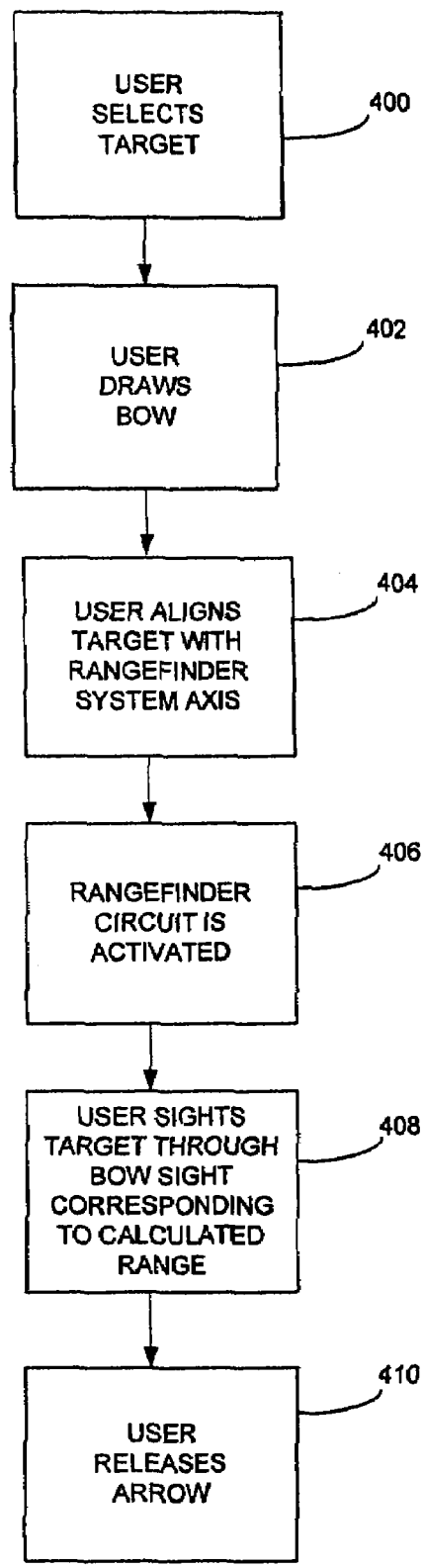
FIG. 17 is a flow chart showing steps taken during a typical use of the rangefinder system of this application.

The steps of the process are also shown in FIG. 17A. In step 400, the user acquires or selects a target, i.e., by visually sensing a target. In step 402, the user draws the bow to a full draw position, thus extending the arm holding the bow and simultaneously placing the rangefinder system 100 attached to that arm in its approximate operating position. Notably, this is only step in the process involving significant body movement that could potentially alert a game target to the user's presence. Optionally, the range can be determined before the bow is drawn. In step 404, the user then aligns his eye along the rangefinder system 100 and at the target, which may require a slight movement, but is readily accomplished while the extended arm remains outstretched and the bow remains drawn. In step 406, the user activates the rangefinding circuit (e.g., by pressing the switch 300). The user then reads the calculated distance on the display 140. In step 408, with the bow already drawn, the user sights the target through the bow sight, which may require sighting along a specific point on the sight corresponding to the calculated distance to the target. In step 410, the user releases the bow string to shoot the arrow toward the target.

Figure 18:
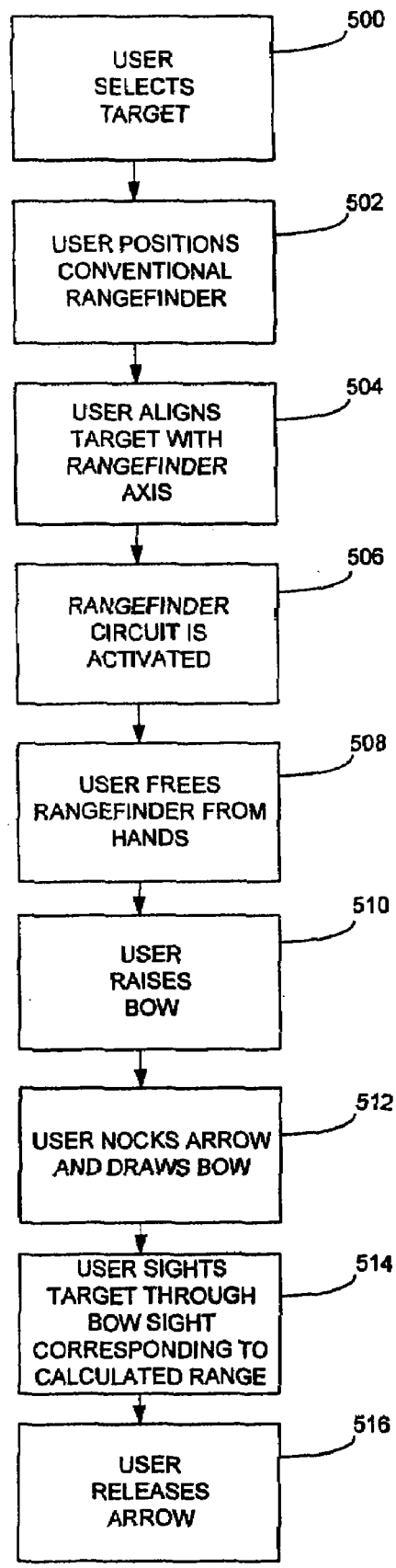
FIG. 18 is a flow chart showing steps taken during a typical use of a conventional rangefinder system.

By way of comparison, the steps involved in determining the range to a target and then shooting an arrow at the target with a conventional handheld range finder consume more time and require additional body movements, either of which can lead to a missed opportunity. As shown in FIG. 18, after the user selects a target (step 500), the user must raise the conventional rangefinder (resembling a pair of binoculars or a monocular/telescope) to his eye level and hold the unit steady (step 502). The user then sights the target through the rangefinder (step 504), actuates the rangefinding circuit (step 506) and notes the range. The user must then free his hands by setting down or storing the rangefinder (step 508), which requires body movement. The user must then raise the bow (step 510), nock an arrow and draw the bowstring (step 512), all of which require movement before the target can be sighted through the bow sight (step 514) and the arrow can be released (step 516).

Figure 15:
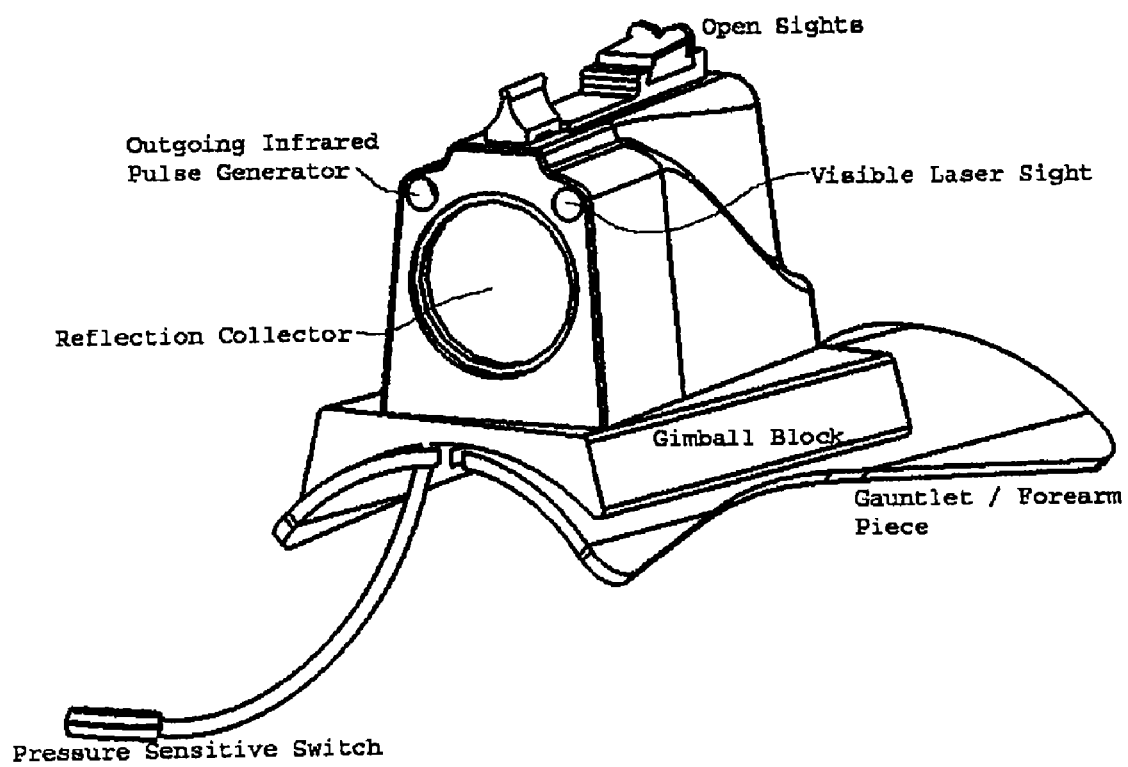
FIG. 15 is a perspective view of an alternative implementation of the rangefinder system having an optional laser sight and showing the switch for activating the circuit.

FIG. 15 is a perspective view showing an alternative embodiment of the rangefinder system that is similar in most respects to the rangefinder system 100, but includes an optional visible laser sight capable of projecting a laser beam onto the target to assist the user in determining that the correct target is identified before initiating the rangefinding calculation.

In some implementations, the housing and mounting portion are made of aluminum. It would also be possible to make these components from other materials, including metals, alloys, plastics, etc. In most embodiments, it is desirable to keep the weight of the rangefinder system 100 as light as possible.

As is shown in the drawings, various components, including the circuit board 190, the bottom plate 118, the rear sight 134 and the retaining frame 142, are attached by fasteners 98, which can be threaded fasteners. Of course, other fastening arrangements can also be used.

The exterior surfaces of the rangefinder system can be colored as desired. In some implementations, the exterior surfaces are camouflaged with an appropriate pattern to obscure the outlines of the system, such as is shown, e.g., in FIG. 12.

Figure 19:
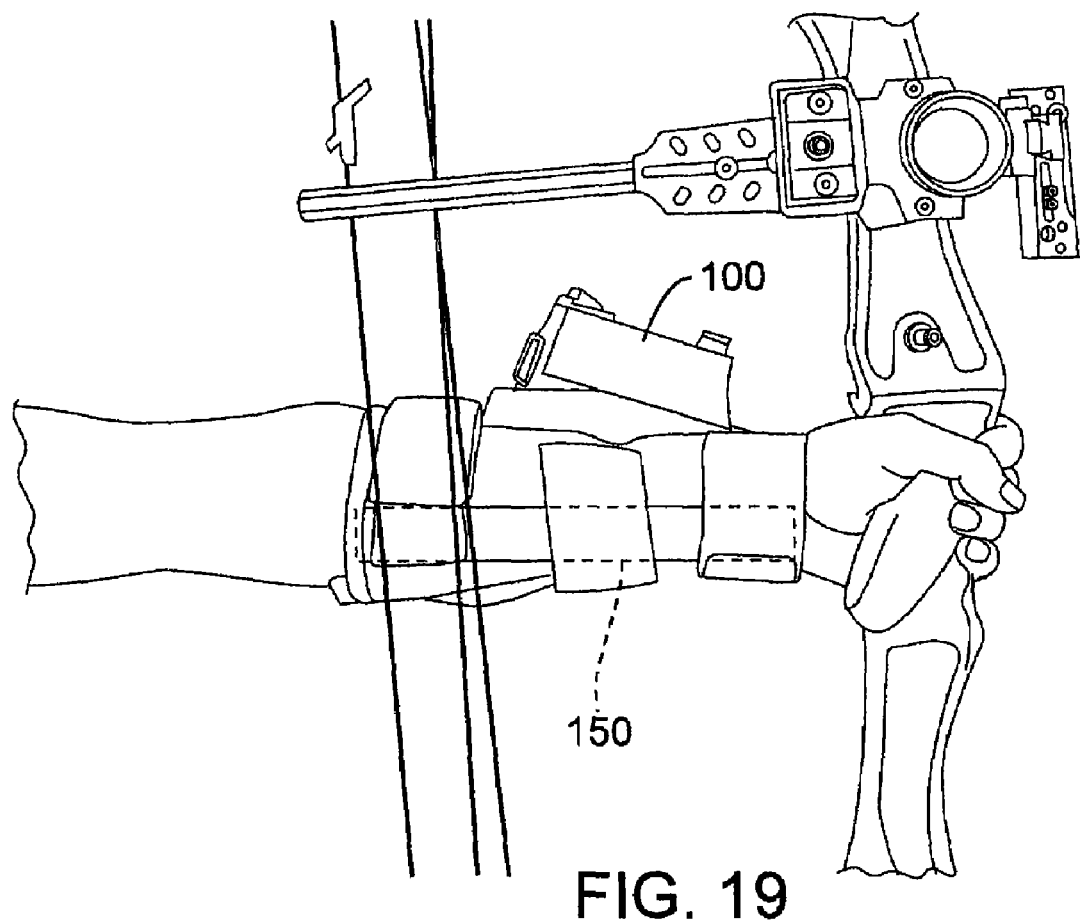
FIG. 19 is a perspective view of an alternative embodiment of the rangefinder system with an integrated arm guard.

Optionally, an arm shield or guard portion can be integrated in the system. For example, as shown in FIG. 19, an arm guard 150 can be made of plastic and positioned to protect an inner surface of the user's arm from inadvertent contact with a bow string released from a drawn position. In one embodiment, the arm guard 150 is attached to a fabric gauntlet by sewing or other suitable method.

Figure 20:
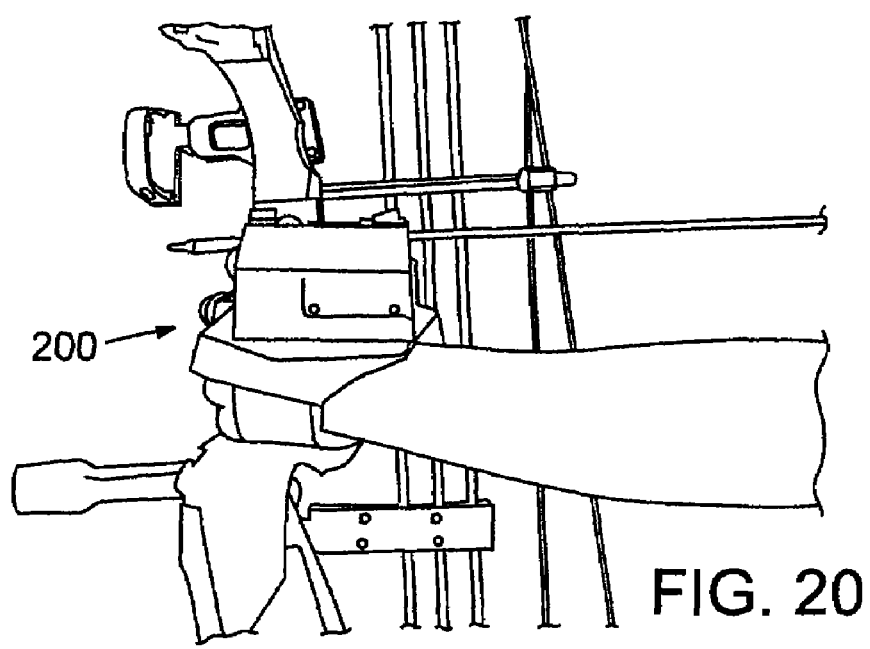
FIG. 20 is a perspective view of an alternative embodiment of the rangefinder system configured for mounting to the back of a user's hand.

As shown in FIG. 20, a rangefinder system 200 according to another embodiment is configured to mount to the back of a user's hand and thus extends rearwardly just past the user's wrist.

In view of the many possible embodiments to which the principles of the disclosed invention may be applied, it should be recognized that the illustrated embodiments are only preferred examples and should not be taken as limiting in scope. Rather, the scope is defined by the following claims.

What is claimed is:

1. A rangefinder, comprising:
  a rangefinder circuit operable to emit an energy beam directed at a selected target, to receive a reflected beam from the target, and to calculate the target's approximate range based on properties of the reflected beam and indicate the calculated range to the user;
  a body-worn member for operably positioning the rangefinder while a user is holding a bow in a drawn position, wherein the body-worn member houses the rangefinder circuit and is sightable at the target when the bow is held outstretched from the user's body in one hand and the user's other hand is holding a string of the bow in the drawn position;
  wherein a portion of the rangefinder is movable relative to the body-worn member to adjust the position of a rangefinder sighting axis to fit the user's draw posture.

2. A rangefinder and range reporting device, comprising:

an electronic rangefinder device capable of calculating an approximate range between a user of the device and a selected target and reporting the calculated range to the user, the rangefinder device being operable by the user while the user is using two hands to hold an object and orient the object generally in a direction of the selected target, wherein the device is supported by the user and is not attached to the object;

the rangefinder device defining a range finding axis extending from the rangefinder toward the selected target, wherein the approximate range between the device and the selected target is determined at least in part by the user sighting along the range finding axis of the rangefinder device at the target, wherein the range finding axis of the rangefinder device is separate from any dedicated sighting axis defined for the object.

3. An arm-worn rangefinding and range-reporting device, comprising:

a mounting portion having an arm-side surface shaped to fit against at least a portion of a user's arm;

a rangefinder body portion adjustably connected to the mounting portion opposite the arm-side surface, the rangefinder body portion housing an electronic rangefinding circuit comprising a battery that powers the circuit, a pulse generator operable to generate a pulse of light directed at a selected target, a photo diode defining an optical axis that receives a portion of reflected light from the target, a microprocessor that calculates the target's distance, and a range reporting display that reports the target's calculated distance to the user;

an external switch operable by the user to activate the electronic rangefinding circuit;

rangefinding optics coupled to the rangefinder body portion, the rangefinder optics including a lens positioned along the optical axis that focuses reflected light from the target on the photodiode; and a range finding sighting device mounted to the rangefinder body portion and aligned with the optical axis that allows the user to aim the rangefinding and range-reporting device at the selected target.

* * * * *